Patented Aug. 19, 1952

2,607,767

UNITED STATES PATENT OFFICE 2,607,767

PROCESS FOR EXTRACTING VEGETABLE PROTEIN

Bruno Vassel, Toledo, Ohio, assignor to International Minerals & Chemical Corporation, a corporation of New York No Drawing. Application May 14, 1949, Serial No. 93,420

9 Claims. (Cl. 260—123.5)

This invention relates to the extraction of protein from vegetable matter, and has particular reference to the extraction of protein from oleaginous, protein-bearing vegetable matter from which substantial amounts of fats and oils have been removed.

Vegetable proteins of varying grades of purity find wide use in a variety of industries such as the manufacture of plastics, glues, certain types of paint, as well as coating for paper, the animal food industry, and as source material in the manufacture of various amino acids and derivatives thereof.

Industrially, all types and grades of protein are needed. The protein requirements vary not only as to their carbohydrate and pigment contents, but different proteins vary in specific properties which make one protein more desirable than the other for specialized fields of use. The fine paper industry requires colorless proteins for sizing purposes, the carbohydrate content of the protein not being critical. The cold-water paint industry requires white proteins for pastel colors; but pigmented proteins can be used for darker shades, provided that the proteins possess certain properties of film formation when air dried. Proteins of varying purities go into resins and plastics. Bonding and laminating glues often contain very impure proteins which, however, possess specific adhesive characteristics.

These proteins may be obtained from a variety of vegetable products but generally those present in vegetable seeds are desired. However, the present invention is applicable to vegetable proteins other than those obtained from seeds or seed meals. Besides proteins, vegetable proteinaceous matter contains material which may generally be classified as fats and oils, carbohydrates, and color components. The extraction of vegetable protein, free of the aforementioned substances, has long been a problem confronting processors of vegetable seeds.

Various processes have hitherto been proposed for extracting vegetable protein from raw source material. The most common process involves a preliminary step of making a water protein extraction of ground seed meal. The resulting extract is said to contain all of the water-soluble carbohydrates, coloring matter, and protein. The pure protein is then customarily separated from other water-solubles in the extract by a process of dialysis which involves the use of a great quantity of water and long periods of time.

A second prior method comprises the step of dissolving the protein-bearing material by means of a salt solution. From these salt solutions, the protein is said to be recoverable by dialysis as before.

A third method includes the step of extracting vegetable meal with an aqueous alkaline solution.

In addition to being cumbersome and expensive, these processes do not generally produce satisfactory yields and do not generally produce a protein of satisfactory purity for a number of specific uses without further and extensive purification of the product.

Other processes whose primary object is to produce a substantially pure vegetable protein have been devised. Among them may be mentioned the process involving the digestion of seed meal in an aqueous alkaline solution, thereby modifying and rendering the proteinaceous matter permanently water-soluble. These processes have among other disadvantages that of at least partly hydrolyzing the protein or, due to the presence of mucilaginous impurities, coloring matter, etc., of rendering economical production of a product acceptable in a variety of industries virtually impossible.

For example, the production of protein of high purity from flaxseed meal has been hitherto impossible unless the mucilage has been removed prior to the protein extraction process. However, in the process for removal of mucilage, removal of the oil also must be accomplished before the protein is extracted from the seed meal. Thus, for all practical purposes, the process is limited to the manufacture of linseed oil or necessitates one employing the aforementioned process to enter into the manufacture of linseed oil.

In addition to the problem presented by the presence of mucilage, which is particularly evident in the case of flaxseed meal, removal of substantially all of the pigment concentrations is extremely desirable and often essential if the product is to find use as a component of paper coating materials or paint composition. These problems are all present to a greater or lesser degree in the extraction of protein from vegetable matter, depending upon the type of matter originally employed.

It is a primary object of the present invention to extract protein from oleaginous, proteinaceous vegetable matter from which substantial amounts of oil have been previously removed; said extracted protein being substantially free of mucilage, other carbohydrates, and color components.

It is a further object of this invention to extract crude protein from oleaginous, proteinaceous vegetable matter from which substantial amounts of oil have been previously removed; said protein containing varying permissible amounts of carbohydrates and color components.

Another object of this invention is to extract protein from flaxseed meal containing substantial amounts of mucilaginous substances; said protein being substantially free of mucilage, other carbohydrates, and color components.

Other objects of this invention will become apparent upon a more complete understanding of the invention as hereinafter set forth.

These objects, as well as others that will be apparent hereinafter, may be accomplished by the present invention by admixing a comminuted, proteinaceous vegetable meal, preferably one which has been previously oil extracted, and an aqueous solution prepared by admixing sodium hydroxide, calcium chloride, and water. The mixture is vigorously stirred and the solids removed from the solution. The resulting solution is then acidified, and the precipitated protein is separated from the solution, washed, and dried.

It has been found that the above process is applicable to such vegetable meals as those obtained from oil extracted peanuts, soybeans, flaxseed, cottonseed, and castor beans. The terms "oleaginous, proteinaceous vegetable residue" and "vegetable residue" or "oilseed meal," as previously and hereinafter used in the description and claims, refer to vegetable matter such as the aforementioned seeds and beans as well as others of similar character from which substantial amounts of fats and oils have been previously removed.

The preferred starting material as previously stated is an oleaginous, proteinaceous vegetable meal or residue from which substantial amounts of oil have been removed. In the preferred embodiment of this invention, material which has been solvent extracted to remove oil is used, although the present invention is not so limited. Thus, vegetable meal from which substantial amounts of oil have been removed by crushing may be used. The substantially oil-free meal is finely ground and added to an aqueous solution of calcium chloride and sodium hydroxide. The solution is preferably prepared by adding, with rapid stirring, an aqueous solution of sodium hydroxide to an aqueous solution of calcium chloride. The calcium hydroxide thus produced is believed to serve as a very efficient medium for the removal of pigment components and carbohydrates. This characteristic of the calcium hydroxide thus produced in situ is thought to be due to the adsorptive properties of the compound in the fine granular form produced by this method. It has been found that if the reverse is done (that is, the calcium chloride added to the sodium hydroxide), relatively coarse particles of calcium hydroxide are formed which greatly impair the efficiency of the process. It has also been found that calcium bromide, calcium hydroxide, calcium oxide, and other water-soluble calcium compounds may be used, although they are far less efficient when substituted for calcium chloride in the instant novel process. It is possible, through the use of calcium chloride in the instant novel process, to obtain a protein substantially free of carbohydrates and pigment components. Likewise, if desired, a protein containing more pigment component may be produced by simply varying the concentration of the calcium chloride in the solution.

The normalities of the calcium chloride solutions used were figured on the basis of anhydrous calcium chloride; however, it is to be understood that other forms of calcium chloride containing water of crystallization may be employed with equally good results, and that there is no intention to limit the invention to the anhydrous variety of calcium chloride.

The concentrations of sodium hydroxide solution and calcium chloride solution should preferably be such that when admixed, as previously described, the normality of the sodium hydroxide is about 0.5 and the normality of the calcium chloride is between about 0.1 and about 0.6. As the concentration of the calcium chloride is increased, the carbohydrate and pigment content of the protein product decreases. At a calcium chloride concentration beyond about 0.6 N., no further improvement in product quality is observed, although the product is substantially free of the aforementioned carbohydrates and pigments. The aforementioned calcium chloride-sodium hydroxide solution generally may be prepared by pouring, with rapid stirring, one volume of 1.0 N. sodium hydroxide into about an equal volume of an aqueous solution of calcium chloride whose concentration is twice the normality of the concentration of calcium chloride desired in the final aforementioned solution. An oleaginous, proteinaceous vegetable residue, from which substantial amounts of oil have been removed by solvent extraction or other suitable means, is then admixed with the aforementioned solution of calcium chloride and sodium hydroxide, preferably in the ratio of about 3 grams of vegetable residue to about 100 cc. of extracting solution. This ratio may be varied to some degree depending upon the type of oilseed used and the quality of the product desired. The mixture is vigorously shaken, or otherwise stirred, for a period of about two hours. At the end of this period of mixing, which is preferably carried out at room temperature, the solids are removed from the mixture by centrifuging, filtering, or other means, and the resulting slightly turbid solution is adjusted to a pH of between about 3.5 and about 4.5 depending upon the vegetable seed meal used as a starting material. Any acidic material, nonoxidizing under the conditions obtaining, which will give the desired pH may be used; economic considerations being the primary limitation. Thus, while concentrated hydrochloric acid is preferred, dilute sulfuric acid or acetic acid, for example, may also be employed.

Upon the addition of acid, with stirring, the proteins rapidly precipitate and generally may be separated from the mother liquor about one-half hour after acidification. After separation, the protein is washed with an acidified aqueous solution of about 5% sodium chloride. This washing removes substantially all of the pigmented mother liquor adhering to the proteins. The product is then dried in any suitable manner, for example in vacuo, at between about 45° and about 55° C. If 0.5 N. sodium hydroxide aqueous solution is used instead of the aforementioned aqueous calcium chloride and sodium hydroxide solution, a product is obtained which has as much as 7.8% by weight of carbohydrate impurities and is strongly pigmented. In either case, however, the product is soluble in dilute alkaline solution.

For a clearer understanding of the instant novel process, reference may be had to the examples and tables which are hereinafter set forth. It is to be understood, however, that these tables and examples are not to be construed as limitations of the present invention.

EXAMPLE I

To about 30 grams of substantially oil-free (solvent extracted) flaxseed meal was added, at room temperature, a solution prepared by adding with stirring about 500 cc. of about 1.0 N. sodium hydroxide to about an equal volume of about 1.2 N. aqueous calcium chloride. After a period of shaking for about two hours, the solution was filtered, and the resulting slightly turbid filtrate was acidified with concentrated hydrochloric acid to a pH of about 3.75. The precipitate was washed with stirring for about one-half hour with about 500 cc. of about 5% aqueous sodium chloride adjusted to a pH of about 3.75 with hydrochloric acid. Filtering yielded a protein which when dried in vacuo at not above 50° C. was almost pure white and amounted to a little over 10 grams dry weight.

Table I illustrates the properties and purity of the protein isolated from a substantially oil-free, mucilage-containing flaxseed meal.

Table I

| Aqueous Extractant | | Protein | | | | |
|---|---|---|---|---|---|---|
| NaOH | CaCl₂ | Percent By Weight Nitrogen | Percent By Weight Carbohydrate | Percent Light Transmittance of 1 Percent soln. in 0.5 N. NaOH | | |
| | | | | 420 mµ | 520 mµ | 690 mµ |
| 0.5 N | None | 11.35 | 7.7 | 7.1 | 29.0 | 77.0 |
| 0.5 N | +0.2 N | 12.53 | 5.2 | 26.5 | 58.9 | 89.8 |
| 0.5 N | +0.5 N | 16.62 | 1.4 | 41.8 | 80.0 | 92.1 |
| 0.5 N | +0.6 N | 17.10 | 0.9 | 59.1 | 91.7 | 96.0 |
| 0.5 N | +0.7 N | 16.4 | 1.9 | 37.7 | 75.3 | 90.0 |
| 0.75 N | +0.5 N | 13.31 | 2.1 | 8.4 | 39.1 | 79.0 |
| 1.0 N | +0.5 N | 12.40 | 3.5 | 7.8 | 35.8 | 80.5 |

All values corrected for moisture and ash.

In obtaining the results indicated in Table I, the procedure set forth in Example I was employed to isolate the protein. However, as indicated in column 1 of Table I, the normalities of the components of the aqueous extracting solutions were varied and in the first test an aqueous sodium hydroxide solution alone was employed. The percentages by weight of protein nitrogen and carbohydrate in the isolated protein are indicated in columns 2 and 3, respectively, and were obtained by applying conventional analytical methods to the isolated protein. It will be observed that as the concentration of calcium chloride is increased up to 0.6 N., while maintaining the concentration of the sodium hydroxide at about 0.5 N., the amount of carbohydrate remaining in the product is decreased. The quality of the isolated protein with regard to color is indicated in the last three columns of Table I. The pigmentation was determined by the percentage of light transmittance of a 1% solution of the isolated protein in an aqueous 0.5 N. sodium hydroxide solution at 420, 520, and 690 mµ wave bands. It is to be observed that as the calcium chloride concentration is increased up to 0.6 N. the percentage of light transmission, that is, the quality of the product with regard to color, is also increased. Likewise, where flaxseed meal is used as a starting material, the percentage of protein nitrogen in the product is also increased up to the concentration of 0.6 N. calcium chloride. This indicates that a purer protein may be extracted from flaxseed meal by employing the instant novel process instead of using merely an aqueous solution of sodium hydroxide.

EXAMPLE II

To about 100 grams of solvent extracted, finely ground soybean meal was slowly added, with vigorous mechanical stirring, approximately 1600 cc. of an aqueous solution of about 0.5 N. sodium hydroxide containing about 0.5 equivalents of calcium chloride. The mixture was stirred vigorously for about three and one-half hours, centrifuged, and the residual fines filtered off. The filtrate was acidified with concentrated hydrochloric acid to a pH of about 4.1. The precipitated proteins were centrifuged off, covered with a solution of about 5% sodium chloride, the pH of which had been adjusted to about 4.1 with dilute hydrochloric acid. The resulting mixture was stirred for about ten minutes to break up the clumps and to remove the adhered, slightly colored mother liquor and centrifuged again. The proteins thus treated were dried under infra red light and yielded slightly more than 27 grams dry weight of a substantially white product.

The properties and purity of the proteins isolated from several oilseed meals are illustrated in Table II. Table II, line A indicates the results obtained when about a 0.5 N. aqueous sodium hydroxide solution is employed; line B indicates the results obtained when an aqueous solution of about 0.5 N. sodium hydroxide containing about 0.5 N. equivalents of calcium chloride is employed.

The data set forth in Table II was obtained by analysis of the protein isolated in accordance with the procedure set forth in Example II. The proteins were isolated from several oilseed meals as indicated in column 1. In each case, products were obtained by employing a 0.5 N. sodium hydroxide aqueous solution and a 0.5 N. calcium chloride-0.5 N. sodium hydroxide aqueous solution. Each product thus obtained was subjected to the same analytical procedures used in obtaining the data recorded in Table I.

That there is an improved quality of the isolated protein obtained by the use of the instant novel process over that obtained by the use of aqueous 0.5 N. sodium hydroxide is evident. In all cases more protein nitrogen is present in the protein isolated by means of the calcium chloride-sodium hydroxide solution than by merely an aqueous sodium hydroxide solution. It should be noted that a 2 to 3% higher nitrogen content represents considerable improvement in protein quality since each gram of protein nitrogen corresponds to the removal of about 5.8 grams of nonprotein impurities, based on an assumed 17% nitrogen content of the pure protein.

As far as carbohydrate impurities are concerned, peanuts and flaxseed yield a better protein when extracted with aqueous sodium hydroxide-calcium chloride instead of an aqueous sodium hydroxide solution. These oilseed meals decrease in carbohydrate content from 5.8% and 7.7%, respectively, to below 1%. The proteins from cottonseed and soybean meals decrease in carbohydrate content from 4.8% and 4.2% to 2.7%, in either case, but the castor bean proteins contain 1.7% carbohydrates whether treated with a sodium hydroxide or with a calcium chloride-sodium hydroxide solution.

In all cases the final product was found to have benefitted with regard to color removal when a calcium chloride-sodium hydroxide solution was employed instead of an aqueous sodium hydroxide solution. However, each protein benefits to a different extent. Improvements in the appearance of cottonseed and soybean proteins are relatively slight; in castor bean and peanut proteins, the improvement is much more appreciable; and in the case of flaxseed proteins there is a marked improvement.

In Table III, the percentages by weight of various amino acids recovered from the protein isolated from extracting various oilseed meals with 0.5 N. sodium hydroxide solution and with a solution comprising essentially 0.5 N. sodium hydroxide and 0.5 N. calcium chloride are set forth. Line A of Table III indicates the results obtained when about a 0.5 N. aqueous sodium hydroxide solution is employed; line B indicates the results obtained when an aqueous solution of about 0.5 N. sodium hydroxide containing about 0.5 N. equivalents of calcium chloride is employed.

Table II

| Oilseed Meal Used | Protein | | | | |
|---|---|---|---|---|---|
| | Percent By Weight Nitrogen | Percent By Weight Carbohydrate | Percent Light Transmittance of 1 Percent soln. in 0.5 N. NaOH at— | | |
| | | | 420mμ | 520mμ | 690mμ |
| Castor beans: | | | | | |
| A | 12.77 | 1.7 | 44.9 | 76.0 | 89.5 |
| B | 14.63 | 1.7 | 65.8 | 90.5 | 96.5 |
| Soybeans: | | | | | |
| A | 14.63 | 4.2 | 60.0 | 84.5 | 93.0 |
| B | 16.19 | 2.7 | 72.0 | 89.0 | 93.3 |
| Peanuts: | | | | | |
| A | 15.11 | 5.8 | 26.3 | 53.5 | 81.0 |
| B | 17.56 | 0.3 | 65.2 | 85.6 | 93.6 |
| Cottonseed: | | | | | |
| A | 12.83 | 4.8 | 2.2 | 5.4 | 43.9 |
| B | 15.56 | 2.7 | 9.8 | 34.7 | 72.2 |
| Flaxseed: | | | | | |
| A | 11.35 | 7.7 | 7.1 | 29.0 | 77.0 |
| B | 17.10 | 0.9 | 59.1 | 91.7 | 96.0 |

All values are corrected for moisture and ash.

Table III

| Oilseed Meal Used | Percent By Weight Glutamic Acid | Percent By Weight Methionine | Percent By Weight Cystine |
|---|---|---|---|
| Castor beans: | | | |
| A | 10.7 | 0.9 | 0.2 |
| B | 14.5 | 1.1 | 0.9 |
| Soybeans: | | | |
| A | 15.2 | 0.8 | 0.5 |
| B | 19.2 | 0.8 | 0.9 |
| Peanuts: | | | |
| A | 16.5 | 0.7 | 0.5 |
| B | 20.1 | 1.2 | 0.5 |
| Cottonseed: | | | |
| A | 12.9 | 1.0 | 0.5 |
| B | 17.0 | 0.8 | 0.9 |
| Flaxseed: | | | |
| A | 11.7 | 0.7 | 0 |
| B | 18.8 | 1.0 | 1.1 |

All values are corrected for moisture and ash.

The procedure followed in obtaining the data set forth in Table III was to isolate the proteins from their respective oilseed meals in accordance with the procedure as set forth in Example II. The proteins thus isolated were then analyzed for glutamic acid, methionine, and cystine.

The results recorded in Table III clearly indicate that all of the calcium chloride-sodium hydroxide extracted proteins are richer in glutamic acid than the sodium hydroxide extracted proteins.

The methionine concentrations of the proteins isolated from sodium hydroxide extractions are quite uniform for all of the oilseeds ranging between 0.7% and 1.0% by weight. Those concentrations obtained from the calcium chloride-sodium hydroxide extractions are, with the exception of soybean and cottonseed meals, slightly higher.

The cystine values indicated in column 4 of Table III clearly indicate the destructive action of alkali on cystine-containing proteins. Except for peanut meal, all of the sodium hydroxide extracted proteins contain very much less than the calcium chloride-sodium hydroxide extracted proteins. This is particularly evident in the case of flaxseed meal where not a trace of remaining cystine could be detected in the sodium hydroxide extracted protein, yet 1.1% was found in the preparation isolated from calcium chloride-sodium hydroxide extracts.

Table IV summarizes the yields obtained by employing the instant novel process as set forth in Example II. Table IV, line A indicates the results obtained when about a 0.5 N. aqueous sodium hydroxide solution is employed; line B indicates the results obtained when an aqueous solution of about 0.5 N. sodium hydroxide containing about 0.5 N. equivalents of calcium chloride is employed.

As in the previous tables, a comparison is made between the results obtained by employing calcium chloride-sodium hydroxide extracting solution and the results obtained by employing merely sodium hydroxide solution.

Column 1 of Table IV indicates the type of oilseed meal used. Column 2 records the nitrogen content of these oilseed meals. Column 3 indicates the percentage by weight meal nitrogen extracted.

It is well established that not all of the nitrogen in vegetable seeds of the type listed in Table IV is protein nitrogen. It has been found in this regard, as indicated in column 3, that the calcium chloride-sodium hydroxide solution extracts less total meal nitrogen from the five types of seed meal tested. However, as shown in column 5, the results of the analysis of the extract indicate that more protein nitrogen is ex-

*Table IV*

| Oilseed Meal Used | Per Cent By Weight Nitrogen Content of Oilseed Meal | Per Cent By Weight Meal Nitrogen Extracted | Protein Precipitated at pH | Protein Nitrogen (Per Cent By Weight Total Nitrogen in Extract) | Protein Recovered from 100 gm. of meal |
|---|---|---|---|---|---|
| Castor beans: | | | | | |
| A | 11.2 | 93.6 | 4.0 | 77.9 | 55.2 |
| B | 11.2 | 73.1 | 4.0 | 75.0 | 36.1 |
| Soybeans (untoasted): | | | | | |
| A | 8.05 | 89.3 | 4.1 | 78.7 | 33.2 |
| B | 8.05 | 72.2 | 4.1 | 88.3 | 27.3 |
| Peanuts: | | | | | |
| A | 9.34 | 86.8 | 4.4 | 76.5 | 35.3 |
| B | 9.34 | 81.5 | 4.4 | 89.3 | 33.2 |
| Cottonseed: | | | | | |
| A | 8.06 | 86.1 | 3.8 | 72.4 | 33.8 |
| B | 8.06 | 54.4 | 3.8 | 56.4 | 13.7 |
| Flaxseed: | | | | | |
| A | 6.34 | 75.9 | 3.8 | 65.6 | 23.9 |
| B | 6.34 | 58.5 | 3.8 | 66.7 | 12.4 | tracted by the instant novel process if soybean, flaxseed, or peanut meal is employed. The protein nitrogen referred to is that capable of precipitation by the proper pH adjustment as indicated in column 4. From these data, it is indicated that, quantitatively, castor beans appear to be the best source when a sodium hydroxide solution is the solvent, but peanut meal is superior quantitatively when calcium chloride-sodium hydroxide extracts are made. It is to be noted that these data referring to percentages of extracted and recovered nitrogen are of value only to the extent that they reveal comparative efficiencies of two or more solvents. The absolute amounts of protein recovered depend also upon the nitrogen content of the starting material. This is recorded in column 2 of Table IV.

The data in Table IV are primarily concerned with a comparison of yields when the two solvents are employed. This table does not indicate the quality of the protein produced. For example, the yield of flaxseed meal, as indicated in column 6 of Table IV, is only 12.4 grams when a calcium chloride-sodium hydroxide solution is employed, as compared with 23.9 grams if extracted with a sodium hydroxide solution. However, reference to Tables I and II indicates a marked improvement in the quality of the calcium chloride-sodium hydroxide extracted protein both in the case of flaxseed and the other vegetable seed meals. The economical production of a protein of such a high degree of purity as is accomplished by the instant novel process compensates for the lower yield which is generally obtained.

Having fully described the nature and character of the invention, what is desired to be secured by Letters Patent is:

1. A process for extracting the proteinaceous matter from oleaginous proteinaceous vegetable residue which comprises admixing said residue from which substantial amounts of oil have been previously removed with an aqueous mixture prepared by adding to an aqueous calcium chloride solution sufficient aqueous sodium hydroxide solution to obtain a concentration of about 0.5 N. sodium hydroxide and between about 0.1 and about 0.7 N. calcium chloride in the combined mixture, vigorously agitating the resulting mixture, separating solid material therefrom, adding to the resulting solution sufficient mineral acid, nonoxidizing under the conditions obtained, to adjust the pH of the aforesaid solution to between about 3.5 and about 4.5, and separating the precipitated proteinaceous matter therefrom.

2. A process according to claim 1 wherein the vegetable residue comprises essentially flaxseed meal from which substantial amounts of oil have been removed.

3. A process for extracting proteinaceous matter from oleaginous proteinaceous vegetable residue which comprises admixing said residue from which substantial amounts of oil have been previously removed with an aqueous solution prepared by adding with agitation to an aqueous calcium chloride solution sufficient aqueous sodium hydroxide solution to obtain a concentration of about 0.5 N. sodium hydroxide and between about 0.1 and about 0.7 calcium chloride in the combined mixture, vigorously agitating the resulting mixture, separating the solid material therefrom, adding to the resulting solution sufficient mineral acid, nonoxidizing under the conditions obtained, to adjust the pH of the aforesaid solution to between about 3.5 and about 4.5, and separating the precipitated proteinaceous matter therefrom.

4. A process according to claim 3 in which the vegetable residue is obtained from the oil extracted meal of flaxseed and wherein the final pH adjustment is to about 3.8.

5. A process according to claim 3 in which the vegetable residue is obtained from the oil extracted meal of soybeans and wherein the final pH adjustment is to about 4.1.

6. A process according to claim 3 in which the vegetable residue is obtained from the oil extracted meal of cottonseed and wherein the final pH adjustment is to about 3.8.

7. A process for extracting proteinaceous matter from oleaginous proteinaceous vegetable residue which comprises admixing said residue from which substantial amounts of oil have been previously removed with an aqueous mixture prepared by adding to an aqueous calcium chloride solution having a concentration of between about 0.2 and about 1.4 N. about an equal volume of a solution of about 1.0 N. sodium hydroxide, vigorously agitating the resulting mixture, separating the solid matter therefrom, adding to the resulting solution sufficient mineral acid, nonoxidizing under the conditions obtained, to adjust the pH of the aforesaid solution to between about 3.5 and about 4.5, and separating the precipitated proteinaceous matter therefrom.

8. A process for extracting proteinaceous matter from oleaginous proteinaceous vegetable residue which comprises admixing said residue from which substantial amounts of oil have been previously removed with an aqueous mixture prepared by adding with agitation to an aqueous calcium chloride solution having a concentration of between about 0.2 and about 1.4 N. about an equal volume of a solution of about 1.0 N. sodium hydroxide, vigorously agitating the resulting mixture for about 2 hours, separating the solid matter therefrom, adding to the resulting solution sufficient mineral acid, nonoxidizing under the conditions obtained, to adjust the pH of the aforesaid solution to between about 3.5 and about 4.5, and separating the precipitated proteinaceous matter therefrom.

9. A process for extracting proteinaceous matter from substantially oil free mucilage-containing flaxseed meal which comprises admixing said meal and an aqueous mixture prepared by adding with agitation to an aqueous calcium chloride solution having a concentration of between about 0.2 and about 1.4 N. about an equal volume of about 1.0 N. sodium hydroxide, agitating the resulting mixture vigorously for about 2 hours, separating solid material therefrom, acidifying the resulting solution with concentrated hydrochloric acid to a pH of between about 3.7 and about 3.8, and separating the precipitated proteinaceous matter therefrom.

BRUNO VASSEL.

REFERENCES CITED

The following references are of record in the file of this patent:

Smith et al.: Ind. and Eng. Chem., vol. 30, 1414–1418 (December 1938).